(12) United States Patent
Nishizaki et al.

(10) Patent No.: US 6,470,250 B2
(45) Date of Patent: Oct. 22, 2002

(54) VEHICLE ATTITUDE CONTROL APPARATUS

(75) Inventors: Katsutoshi Nishizaki, Nabari (JP); Shiro Nakano, Osaka (JP); Masaya Segawa, Tenri (JP); Ryouhei Hayama, Nabari (JP); Kazuhiro Kato, Itami (JP)

(73) Assignees: Koyo Seiko Co., Ltd., Osaka (JP); Sumitomo (SEI) Brake Systems, Inc., Hisai (JP)

( * ) Notice: Subject to any disclaimer, the term of this patent is extended or adjusted under 35 U.S.C. 154(b) by 0 days.

(21) Appl. No.: 09/874,605

(22) Filed: Jun. 5, 2001

(65) Prior Publication Data

US 2001/0056317 A1 Dec. 27, 2001

(30) Foreign Application Priority Data

Jun. 21, 2000 (JP) ........................................ 2000-186381

(51) Int. Cl.[7] ................................................ B62D 6/00
(52) U.S. Cl. .............................. 701/48; 701/1; 701/41; 701/70; 303/146
(58) Field of Search ................................ 701/1, 37, 38, 701/41, 42, 48, 70, 72; 303/139, 140, 146

(56) References Cited

U.S. PATENT DOCUMENTS

| | | | | |
|---|---|---|---|---|
| 4,937,748 A | * | 6/1990 | Yonekawa et al. ............. 701/38 |
| 5,711,585 A | * | 1/1998 | Tozu et al. .................. 303/146 |
| 5,762,406 A | * | 6/1998 | Yasui et al. ................. 303/146 |
| 6,205,375 B1 | * | 3/2001 | Naito ............................. 701/1 |
| 6,374,162 B1 | * | 4/2002 | Tanaka et al. .................. 701/1 |
| 6,415,212 B2 | * | 7/2002 | Nishizaki et al. ............. 701/41 |

* cited by examiner

Primary Examiner—Gary Chin
(74) Attorney, Agent, or Firm—Jordan and Hamburg LLP

(57) ABSTRACT

A vehicle attitude control apparatus, wherein a corrected behavior index value for steering is determined in such a manner that the deviation between a target behavior index value for a vehicle and a corrected behavior index value for steering decreases, as an instability index value correlating to the amount of under-steer increases, and when the target behavior index value and the behavior index value are equal, the corrected behavior index value for steering is set to equal the behavior index value. A corrected behavior index value for braking is determined in such a manner that the deviation between the target behavior index value and a corrected behavior index value for braking increases, as the instability index value increases, and when the target behavior index value and the behavior index value are equal, the corrected behavior index value for braking is set to equal the behavior index value. The steering actuator and braking forces are controlled in such a manner that, when not in the state of under-steer, the behavior index value follows the target behavior index value, and when in the state of under-steer, the corrected behavior index value for steering and corrected behavior index value for braking follow the target behavior index value.

6 Claims, 10 Drawing Sheets

Fig.4 (1)
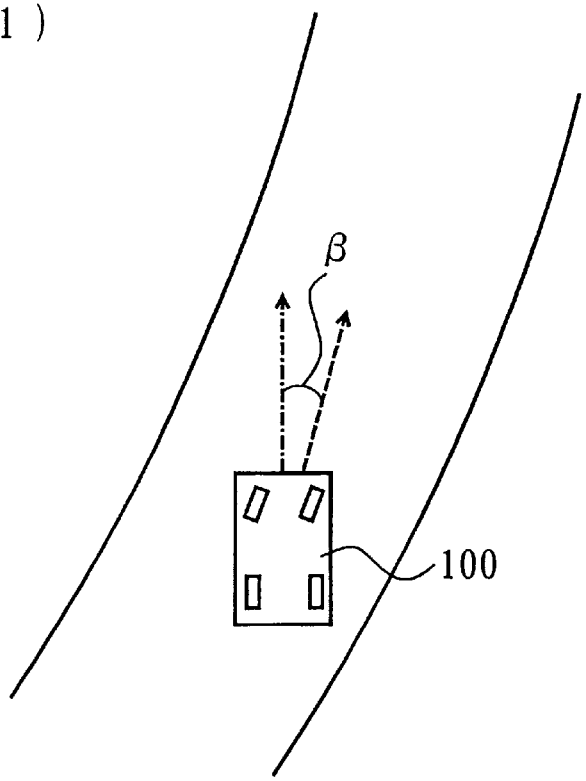
Fig.4 (2)
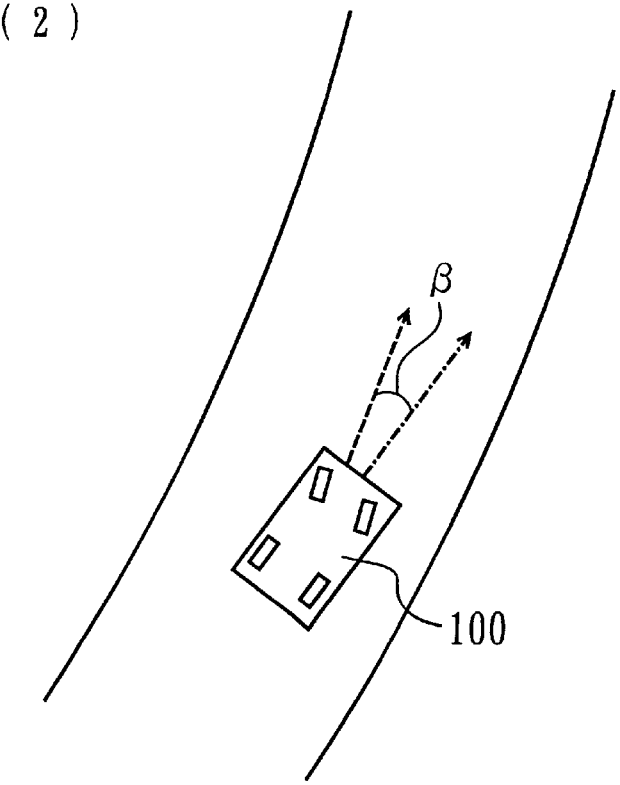

VEHICLE ATTITUDE CONTROL APPARATUS

FIELD OF THE INVENTION

The present invention relates to a vehicle attitude control apparatus whereby the behaviour of a vehicle can be stabilized.

DESCRIPTION OF THE RELATED ART

If a vehicle has entered a state of under-steer or a state of over-steer, then it is sought to stabilize the behaviour of the vehicle by controlling the braking forces applied to the vehicle wheels.

However, if the steering angle is raised excessively in order to eliminate a state of under-steer, then it becomes difficult to maintain a linear region where the lateral slip angle of the vehicle wheels is proportional to the cornering force, and hence even if the braking forces are controlled in the foregoing manner, it is not possible to stabilize the vehicle behaviour.

It is an object of the present invention to provide a vehicle attitude control apparatus capable of resolving the aforementioned problem.

SUMMARY OF THE INVENTION

The vehicle attitude control apparatus according to the present invention comprises: an operating member; a steering actuator driven in accordance with the operation of the operating member; a mechanism for transmitting movement of the steering actuator to the wheels of a vehicle, in such a manner that the steering angle changes in accordance with the movement thereof; means for determining a behaviour index value corresponding to changes in vehicle behaviour on the basis of changes in the steering angle; means for determining the amount of operation of the operating member; means for determining a target behaviour index value corresponding to the determined amount of operation, on the basis of a stored relationship between the amount of operation and the target behaviour index value; means for determining whether or not the vehicle is in a state of under-steer; means for controlling the steering actuator in such a manner that the behaviour index value follows the target behaviour index value, when the vehicle is not in the state of under-steer; means for controlling the braking forces at the vehicle wheels in such a manner that the behaviour index value follows the target behaviour index value, when the vehicle is not in the state of under-steer; and means for determining an instability index value correlating to the degree of under-steer.

A first aspect of the present invention further comprises: means for storing a predetermined first relationship between the behaviour index value, the target behaviour index value, the instability index value and a corrected behaviour index value for steering; means for determining the corrected behaviour index value for steering on the basis of the determined behaviour index value, the determined target behaviour index value, the determined instability index value, and the stored first relationship; means for storing a predetermined second relationship between the behaviour index value, the target behaviour index value, the instability index value and a corrected behaviour index value for braking; and means for determining the corrected behaviour index value for braking on the basis of the determined behaviour index value, the determined target behaviour index value, the determined instability index value, and the stored second relationship; wherein the first relationship is determined in such a manner, as the magnitude of the instability index value increases up to a predetermined set value, the deviation between the target behaviour index value and the corrected behaviour index value for steering decreases, and when the target behaviour index value and the behaviour index value are equal, the corrected behaviour index value for steering becomes equal to the behaviour index value; the second relationship is determined in such a manner that as the magnitude of the instability. index value increases up to a predetermined set value, the deviation between the target behaviour index value and the corrected behaviour index value for braking increases, and when the target behaviour index value and the behaviour index value are equal, the corrected behaviour index value for braking becomes equal to the behaviour index value; and when the vehicle is in the state of under-steer, the steering actuator is controlled in such a manner that the corrected behaviour index value for steering instead of the behaviour index value follows the target behaviour index value, and the braking forces are controlled in such a manner that the corrected behaviour index value for braking instead of the behaviour index value follows the target behaviour index value.

A second aspect of the present invention comprises: means for storing a predetermined first relationship between the behaviour index value, the target behaviour index value, the instability index value and a corrected target behaviour index value for steering; means for determining the corrected target behaviour index value for steering on the basis of the determined behaviour index value, the determined target behaviour index value, the determined instability index value, and the stored first relationship; means for storing a predetermined second relationship between the behaviour index value, the target behaviour index value, the instability index value and a corrected target behaviour index value for braking; and means for determining the corrected target behaviour index value for braking on the basis of the determined behaviour index value, the determined target behaviour index value, the determined instability index value, and the stored second relationship; wherein the first relationship is determined in such a manner, as the magnitude of the instability index value increases up to a predetermined set value, the deviation between the corrected target behaviour index value for steering and the behaviour index value decreases, and when the target behaviour index value and the behaviour index value are equal, the corrected target behaviour index value for steering becomes equal to the target behaviour index value; the second relationship is determined in such a manner that, as the magnitude of the instability index value increases up to a predetermined set value, the deviation between the corrected target behaviour index value for braking and the behaviour index value increases, and when the target behaviour index value and the behaviour index value are equal, the corrected target behaviour index value for braking becomes equal to the target behaviour index value; and when the vehicle is in the state of under-steer, the steering actuator is controlled in such a manner that the behaviour index value follows the corrected target behaviour index value for steering, instead of the target behaviour index value, and the braking forces are controlled in such a manner that the behaviour index value follows the corrected target behaviour index value for braking instead of the target behaviour index value.

According to each of the aspects of the present invention, when the vehicle is not in a state of under-steer, the steering actuator and braking forces at the wheels are controlled in such a manner that the deviation between the determined behaviour index value and the target behaviour index value for the vehicle corresponding to the amount of operation of the operating member is reduced, thereby stabilizing the vehicle behaviour.

According to the first aspect of the present invention, if the vehicle is in the state of under-steer, then the steering actuator is controlled in such a manner that the deviation between the corrected behaviour index value for steering, instead of the behaviour index value, and the target behaviour index value is reduced, and the braking forces are controlled in such a manner that the deviation between the corrected behaviour index value for braking, instead of the behaviour index value, and the target behaviour index value is reduced. As the amount of under-steer increases, the deviation between the target behaviour index value and the corrected behaviour index value for steering decreases, and the deviation between the target behaviour index value and the corrected behaviour index value for braking increases.

According to the second aspect of the present invention, if the vehicle is in the state of under-steer, then the steering actuator is controlled in such a manner that the deviation between the corrected target behaviour index value for steering, instead of the target behaviour index value, and the behaviour index value is reduced, and the braking forces are controlled in such a manner that the deviation between the corrected target behaviour index value for braking, instead of the target behaviour index value, and the behaviour index value is reduced. As the amount of under-steer increases, the deviation between the corrected target behaviour index value for steering and the behaviour index value decreases, and the deviation between the corrected target behaviour index value for braking and the behaviour index value increases.

Therefore, according to the aspects of the present invention, as the degree of under-steer increases, the amount of control of the steering actuator for stabilizing the vehicle behaviour decreases, and the amount of control of the braking forces increases. Accordingly, in the state of under-steer, it is possible to prevent the steering angle from increasing excessively, and hence the vehicle behaviour can be stabilized. Moreover, the braking force for stabilizing the vehicle behaviour can be increased as the degree of under-steer rises, without having to provide complicated controls.

In the first aspect of the present invention, desirably, the vehicle wheel lateral slip angle is determined as the instability index value; the deviation between the target behaviour index value and the corrected behaviour index value for steering is taken as zero, when the magnitude of the vehicle wheel lateral slip angle is equal to or greater than a predetermined set value; and the predetermined set value for the magnitude of the vehicle wheel lateral slip angle is set at or below the maximum value of the magnitude of the wheel lateral slip angle which maintains a linear region in which the wheel lateral slip angle is proportional to the cornering force.

In the second aspect of the present invention, desirably, the vehicle wheel lateral slip angle is determined as the instability index value; the deviation between the behaviour index value and the corrected target behaviour index value for steering is taken as zero, when the magnitude of the vehicle wheel lateral slip angle is equal to or greater than a predetermined set value; and the predetermined set value for the magnitude of the vehicle wheel lateral slip angle is set at or below the maximum value of the magnitude of the wheel lateral slip angle which maintains a linear region in which the wheel lateral slip angle is proportional to the cornering force.

Thereby, it is possible to prevent the steering angle from increasing excessively in the case of under-steer, and hence the linear region, in which the lateral slip angle is proportional to the cornering force at the wheels, can be maintained, and the vehicle behaviour can be effectively prevented from becoming unstable by control of the braking forces.

Moreover, in the first aspect of the present invention, desirably, the deviation between the target behaviour index value and the corrected behaviour index value for braking is taken as zero, when the magnitude of the vehicle wheel lateral slip angle is zero.

Furthermore, in the second aspect of the present invention, desirably, the deviation between the behaviour index value and the corrected target behaviour index value for braking is taken as zero, when the magnitude of the vehicle wheel lateral slip angle is zero.

Thereby, it becomes possible to stabilize vehicle behaviour simply by controlling the steering angle, when the lateral slipping state of the wheels terminates, and hence unnecessary controls can be eliminated and the controls can be simplified.

According to the present invention, it is possible to provide a vehicle attitude control apparatus whereby stabilization of vehicle behaviour can be achieved in a vehicle which is in a state of under-steer, by controlling both the steering angle and the braking forces in an integrated manner, without needing to provide a complex control system.

BRIEF DESCRIPTION OF THE DRAWINGS

FIG. 4(1) is a diagram showing a vehicle performing lateral slip in an over-steer state; and FIG. 4(2) is a diagram showing a vehicle performing lateral slip in a state of under-steer;

FIG. 10(2) is a diagram showing the change over time of the steering angle and the wheel cylinder pressure at the rear right wheel in this case; and FIG. 10(3) is a diagram showing the change over time of the front wheel lateral slip angle in this case.

DESCRIPTION OF THE PREFERRED EMBODIMENTS

Figure 1:
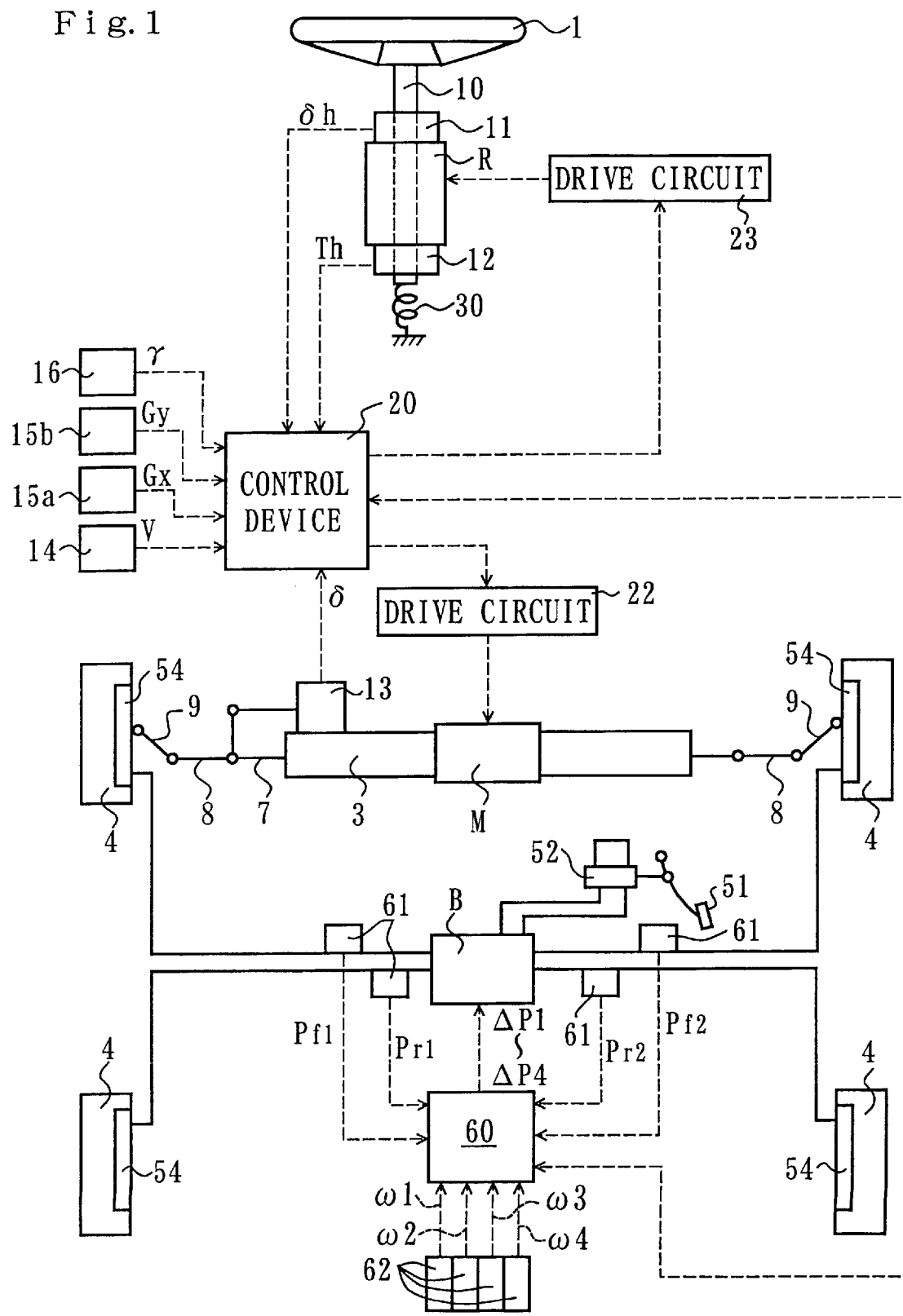
FIG. 1 is an illustrative diagram of a vehicle attitude control apparatus according to the first embodiment of the present invention.

A first embodiment of the present invention is described here with reference to FIG. 1 to FIG. 7. The vehicle attitude control apparatus shown in FIG. 1 transmits the movement of a steering actuator M driven in accordance with rotational operation of a steering wheel (operating member) 1, to the front right and left vehicle wheels 4, in such a manner that the steering angle is changed via a steering gear 3, without the steering wheel 1 being connected mechanically to the vehicle wheels 4.

The steering actuator M can be constituted by an electromotive motor, such as a commonly known brushless motor, for example. The steering gear 3 has a movement converting mechanism for converting the rotational movement of the output shaft of the steering actuator M to linear movement of a steering rod 7. The movement of the steering rod 7 is transmitted to the wheels 4 of the vehicle by means of tie rods 8 and knuckle arms 9. It is possible to use a commonly known device for the steering gear 3, and there are no limitations on the constitution thereof, provided that the steering angle can be changed by movement of the steering actuator M; for example, it can be constituted by means of a nut which are driven rotationally by the output shaft of the steering actuator M, and a screw shaft which screws into the nut and is formed integrally with the steering rod 7. The vehicle wheels 4 are set to a wheel alignment whereby, in a state where the steering actuator M is not driven, the vehicle wheels 4 are able to return to a direct forward steering position due to self-aligning torque.

The steering wheel 1 is coupled to a rotational shaft 10 which is supported rotatably on the vehicle body. In order to generate an operational reaction required when operating the steering wheel 1, a reactive force actuator R is provided for applying a torque to the rotational shaft 10. This reactive force actuator R can be constituted by an electromotive motor, such as a brushless motor, having an output shaft which is united with the rotational shaft 10, for example.

An elastic member 30 for applying an elastic force to the steering wheel 1 in a direction returning to the direct forward steering position is provided. This elastic member 30 can be constituted, for example, by a spring applying an elastic force to the rotational shaft 10. When the aforementioned reactive force actuator R applies no torque to the rotational shaft 10, the steering wheel 1 returns to the direct forward steering position, due to the aforementioned elastic force.

An angle sensor 11 is provided for detecting the angle of operation corresponding to the angle of rotation of the rotational shaft 10, as the amount of operation of the steering wheel 1. Furthermore, a torque sensor 12 is provided for detecting the operating torque of the steering wheel 1. The direction of steering can be determined from the torque signal detected by the torque sensor 12.

A steering angle sensor 13 is provided for detecting the amount of movement of the steering rod 7 corresponding to the steering angle of the vehicle wheels. This steering angle sensor 13 can be constituted by a potentiometer.

The angle sensor 11, torque sensor 12 and steering angle sensor 13 are connected to a steering system control device 20 constituted by a computer. This steering system control device 20 is also connected to a yaw rate sensor 16 for detecting the yaw rate of the vehicle, a speed sensor 14 for detecting the speed of the vehicle, a longitudinal direction acceleration sensor 15a for detecting the acceleration of the vehicle in the longitudinal direction thereof, and a lateral acceleration sensor 15b for detecting the lateral acceleration of the vehicle. In this embodiment, the yaw rate is taken as the behaviour index value corresponding to changes in vehicle behaviour on the basis of changes in the steering angle. The steering system control device 20 controls the aforementioned steering actuator M and the reactive force actuator R via drive circuits 22, 23.

A braking system for braking the front and rear, left and right-hand wheels 4 of the vehicle is also provided. The braking system generates a braking hydraulic pressure corresponding to foot pressure on a brake pedal 51, by means of a master cylinder 52. This braking hydraulic pressure is amplified by a braking hydraulic pressure control unit B and distributed to brake devices 54 at the respective vehicle wheels 4, these brake devices 54 producing a braking force on the respective wheels 4. The braking hydraulic pressure control unit B is connected to a driving system control device 60 constituted by a computer. This driving system control device 60 is connected to braking pressure sensors 61 for individually detecting the wheel cylinder pressures, $P_{f1}$, $P_{f2}$, $P_{r1}$, $P_{r2}$, corresponding to the respective braking hydraulic pressures at the vehicle wheels 4, and wheel speed sensors 62 for individually detecting the respective rotational speeds of the vehicle wheels 4. The driving system control device 60 and the aforementioned steering system control device 20 are connected in such a manner that data can be transmitted therebetween. The driving system control device 60 controls the braking hydraulic pressure control unit B in such a manner that the braking hydraulic pressure can be amplified and then distributed in accordance with the rotational speeds of the respective vehicle wheels 4 as detected by the wheel speed sensors 62 and feedback values from the braking pressure sensors 61. Thereby, it is possible to control the respective braking forces at the front and rear, left- and right-hand wheels 4, in an individual fashion. Even in cases where the brake pedal 51 is not operated, the braking hydraulic pressure control unit B is capable of generating braking hydraulic pressure by means of an in-built pump, in accordance with a signal from the driving system control device 60.

Figure 2:
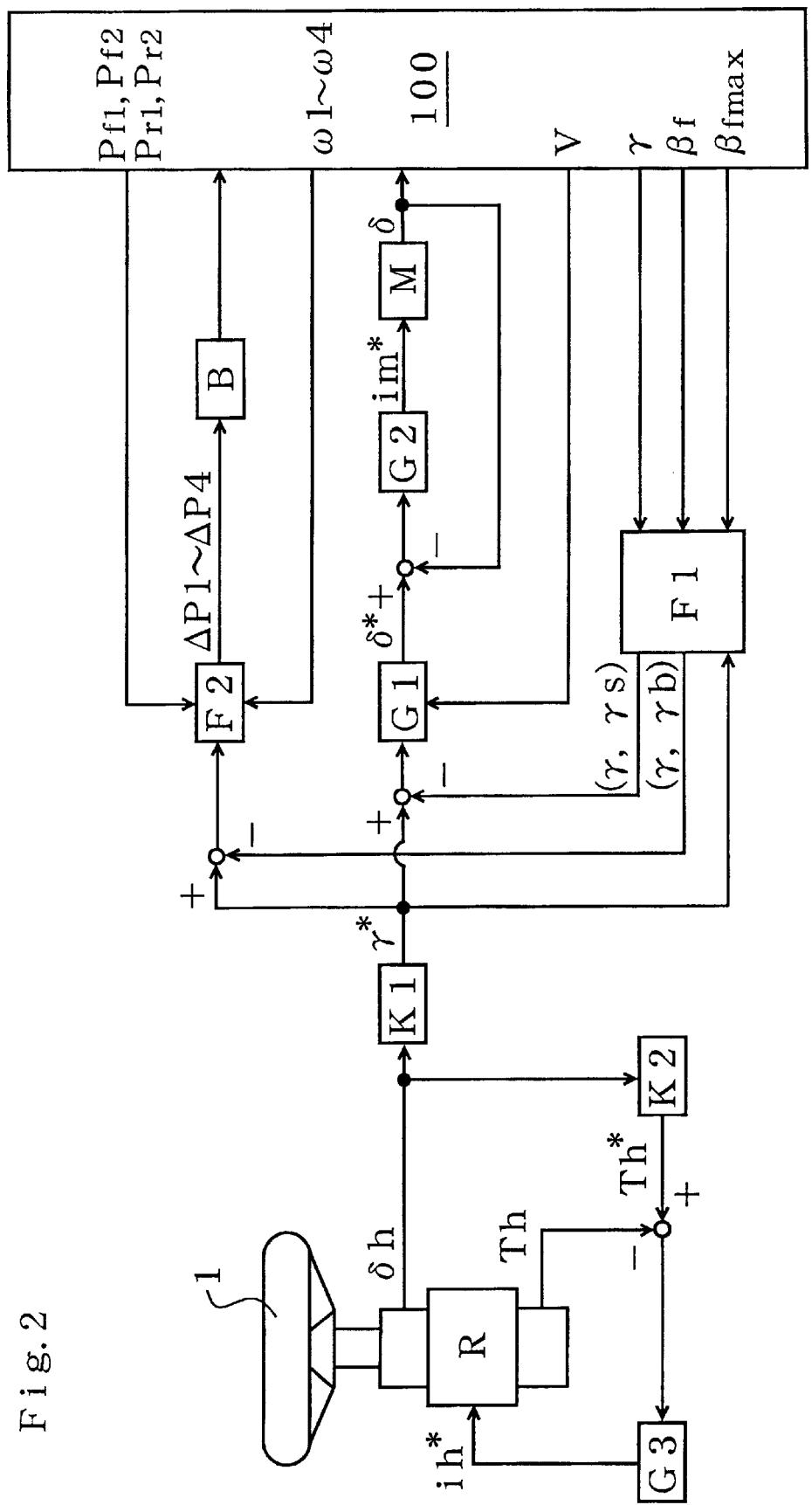
FIG. 2 is a control block diagram of the vehicle attitude control apparatus according to the first embodiment of the present invention.

FIG. 2 is an illustrative block diagram of the control structure of the aforementioned attitude control apparatus. The symbols used in this block diagram and the following description are listed below. Of the values represented by these symbols, any value having a direction corresponding to the left/right directions of the vehicle is positive when acting in one direction of the left/right directions, and negative when acting in the other direction thereof. Furthermore, any value having a direction corresponding to the front/back directions of the vehicle is positive when acting in one direction of the front/back directions, and negative when acting in the other direction thereof.

$\delta h$: operating angle
$\delta$: steering angle
$\delta^*$: target steering angle
Th: operational torque
Th*: target operational torque
$\gamma$: yaw rate
$\gamma^*$: target yaw rate γs: corrected yaw rate for steering
γb: corrected yaw rate for braking
V: vehicle speed
ω1, ω2, ω3, ω4: wheel revolution speeds
im*: target drive current for steering actuator M
ih*: target drive current for operation actuator R
ie*: target drive current for throttle valve drive actuator E
$P_{f1}$: front left wheel cylinder pressure
$P_{f2}$: front right wheel cylinder pressure
$P_{r1}$: rear left wheel cylinder pressure
$P_{r2}$: rear right wheel cylinder pressure
ΔP1, ΔP2, ΔP3, ΔP4: command braking hydraulic pressure
$β_f$: front wheel lateral slip angle
$β_{fmax}$: front wheel lateral slip angle at maximum lateral force
$β_r$: rear wheel lateral slip angle
β: vehicle lateral slip angle
dβ/dt: vehicle lateral slip angle speed
L: wheelbase
$L_f$: distance from front wheels to vehicle centre of gravity
$L_r$: distance from rear wheels to vehicle centre of gravity
d: tread
$h_g$: height of vehicle centre of gravity
$G_X$: longitudinal acceleration
$G_{:Y}$: lateral acceleration
W: tire load of each wheel
μ: coefficient of friction between tire and road surface
$F_y$: cornering force
$K_{f0}$: front wheel cornering power per wheel when not braking
$K_{f0}$: sum of front wheel cornering power when braking
$K_{f1}$: cornering power of front left wheel when braking
$K_{f2}$: cornering power of front left wheel when braking
$P_f$: front wheel lock pressure at static load
$P_{f1}$: front left wheel cylinder pressure
$P_{f2}$: front right wheel cylinder pressure Furthermore, K1 is the gain of the target yaw rate γ* with respect to the steering angle δh of the steering wheel 1. The steering system control device 20 calculates the target yaw rate γ* on the basis of the stored relationship γ*=K1·δh, and the operating angle δh as detected by the steering angle sensor 11. In other words, the steering system control device 20 stores the gain K1 representing the predetermined relationship between the operating angle δh and the target yaw rate γ*, and it calculates the target yaw rate γ* corresponding to the detected operating angle δh, on the basis of this relationship.

K2 is the gain of the target operational torque Th* with respect to the operating angle δh. The target operational torque Th* is calculated from the relationship Th*=K2·δh and the operating angle bh as detected by the angle sensor 11. In other words, the steering system control device 20 stores the gain K2 representing the predetermined relationship between the target operational torque Th* and the operating angle δh, and it calculates the target operational torque Th* on the basis of this relationship and the detected operating angle δh. This gain K2 is adjusted in order that optimum control is performed. It is also possible to use the operational torque Th instead of the operating angle δh, storing a predetermined relationship between the target operational torque Th* and the operational torque Th, and calculating the target operational torque Th* on the basis of this relationship and the operational torque Th.

F1 is a calculating section in the driving system control device 60, and it performs calculation for judging whether or not the vehicle is in a state of under-steer, calculation of an instability index value correlating to the degree of under-steer, calculation of the corrected yaw rate γs for steering, and calculation of the corrected yaw rate γb for braking.

Figure 3:
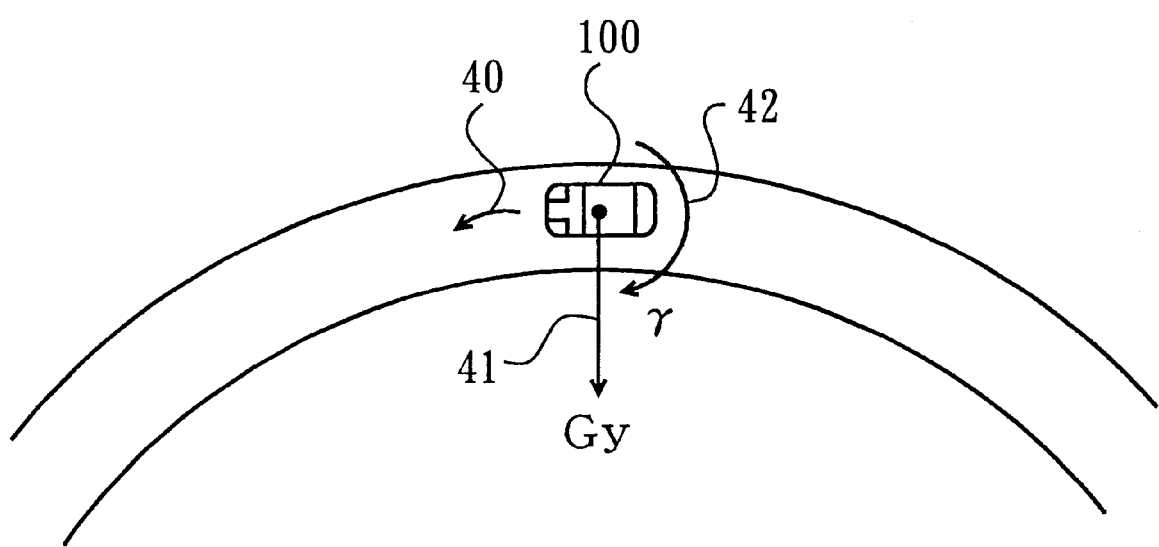
FIG. 3 is a diagram showing a vehicle in a steady turning state.

To be more precise, in a vehicle 100 turning at vehicle speed V as indicated by the arrow 40 in FIG. 3, the relationship between the lateral acceleration $G_y$ acting in the direction indicated by arrow 41 and the yaw rate γ acting the direction indicated by arrow 42 approximates to γ=$G_y$/V, if the vehicle 100 is regarded as being in a steady turning state. In a vehicle 100 performing lateral slip in an over-steer state as illustrated in FIG. 4 (1), or in a vehicle 100 performing lateral slip in a state of under-steer as illustrated in FIG. 4 (2), the angle formed between the central axis of the vehicle body, as indicated by the single-dotted line passing in the front/rear direction of the vehicle 100, and the direction in which the vehicle 100 would travel if there was no lateral slip, as indicated by the broken line, is the lateral slip angle β of the vehicle. The rate of change of this vehicle lateral slip angle β, namely dβ/dt, approximates to ($G_y$/V−γ), and hence the vehicle lateral slip angle β is given approximately by the integral of ($G_y$/V−γ) with respect to time, as shown in equation (1) below.

$$β=\int(dβ/dt)dt=\int(G_y/V-γ)dt \tag{1}$$

The driving system control device 60 stores calculation formula (1) giving the relationship between the vehicle lateral slip angle β and the values of $G_y$, V and γ, which correspond to the vehicle lateral slip angle β. This device 60 determines the vehicle lateral slip angle β in a time series, on the basis of this relationship and the detected values for $G_y$, V and γ.

When the direction in which the driver is operating the steering wheel 1 corresponds to the turning direction of the vehicle, a state of under-steer occurs if the determined yaw rate γ does not reach the target yaw rate γ*. Therefore, when the determined yaw rate γ has not reached the target yaw rate γ*, and the determined vehicle lateral slip angle 62 has changed such that the yaw rate γ moves away from the target yaw rate γ*, the driving system control device 60 judges that the vehicle is in a state of under-steer, whereas if the determined yaw rate γ exceeds the target yaw rate γ*, then it judges the vehicle to be in an over-steer state. In the present embodiment, the driving system control device 60 calculates the values of δ·(γ*−γ) and δ·dβ/dt, and judges if δ·(γ*−γ) is positive and if δ·dβ/dt is positive. If δ·(γ*−γ) is positive and δ·dβ/dt is positive, then it judges that the vehicle 100 is in a state of under-steer, since the actual yaw rate γ acting on the vehicle 100 has not reached the target yaw rate γ*, and the absolute value of the vehicle lateral slip angle β is accelerating. While, if δ·(γ*−γ) is negative, or if δ·(γ*−γ) is positive and δ·dβ/dt is negative, then the vehicle 100 is judged to be in an over-steer state.

In the present embodiment, the driving system control device 60 calculates the front wheel lateral slip angle $β_f$, as an instability index value corresponding to the degree of under-steer. This front wheel lateral slip angle $β_f$ is calculated from the vehicle lateral slip angle β, the distance from the front wheels to the centre of gravity $L_f$, the vehicle speed V and the front wheel steering angle δ, according to the following equation (2).

$$\beta_f = \beta + L_f \gamma/V - \delta \quad (2)$$

To be more precise, in addition to determining the aforementioned vehicle lateral slip angle $\beta$ as a value corresponding to the front wheel lateral slip angle $\beta_f$, in the present embodiment, the yaw rate $\gamma$ which is the behaviour index value, vehicle speed V and steering angle $\delta$ are detected. The predetermined calculation formula (2) representing the relationship between the front wheel lateral slip angle $\beta_f$ and the values of $\beta$, V, $\gamma$, and $\delta$, which correspond to this front wheel lateral slip angle $\beta_f$, is stored in the driving system control device 60. This device 60 determines the front wheel lateral slip angle $\beta_f$ on the basis of this relationship and the values corresponding to the front wheel lateral slip angle $\beta_f$.

The rear wheel lateral slip angle $\beta$hd rmay be used as an instability index value instead of the front wheel lateral slip angle $\beta_f$, in which case $\beta_r$ is calculated from the vehicle lateral slip angle $\beta$, the distance from the rear wheels to the centre of gravity $L_r$, the vehicle speed V, and the front wheel steering angle $\delta$, according to equation (3) below.

$$\beta_r = \beta - L_r \gamma/V \quad (3)$$

The driving system control device 60 stores a predetermined first relationship between the yaw rate $\gamma$, target yaw rate $\gamma^*$, front wheel lateral slip angle $\beta_f$, and corrected yaw rate $\gamma$s for steering, and it determines the corrected yaw rate $\gamma$s for steering on the basis of the determined yaw rate $\gamma$, the determined target yaw rate $\gamma^*$, the determined front wheel lateral slip angle $\beta_f$, and this stored first relationship. This first relationship is defined in such a manner that the deviation between the target yaw rate $\gamma^*$ and the corrected yaw rate $\gamma$s for steering decreases as the magnitude $|\beta_f|$ of the front wheel lateral slip angle $\beta_f$ increases up to a predetermined set value, and such that the corrected yaw rate $\gamma$s for steering becomes equal to the yaw rate $\gamma$ when the target yaw rate $\gamma^*$ and the yaw rate $\gamma$ are equal.

Figure 5:
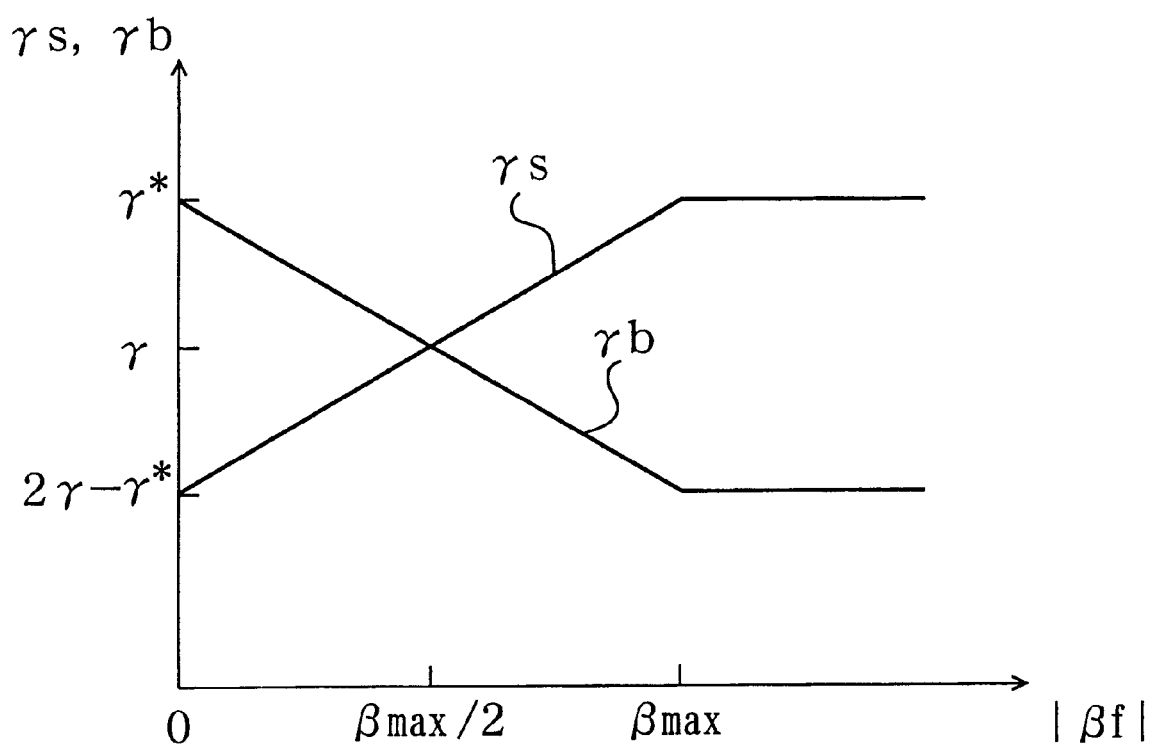
FIG. 5 is a diagram showing the relationship between the front wheel slip angle, the corrected yaw rate for steering angle, and the corrected yaw rate for braking, in the vehicle attitude control apparatus according to the first embodiment of the present invention.

In the present embodiment, as illustrated by equation (4) below and FIG. 5, until the magnitude $|\beta_f|$ of the front wheel lateral slip angle $\beta_f$ reaches a predetermined set value $\beta_{max}$ the corrected yaw rate $\gamma$s for steering is treated as a linear function of the front wheel lateral slip angle $\beta_f$, and if $|\beta_f|$ is equal to or more than this predetermined set value $\beta_{max}$, then the corrected yaw rate $\gamma$s for steering is set equally to the target yaw rate $\gamma^*$.

$$\gamma s = 2|\beta_f|(\gamma^* - \gamma)/\beta_{max} + 2\gamma - \gamma^* \quad (4)$$

The driving system control device 60 stores a predetermined second relationship between the yaw rate $\gamma$, target yaw rate $\gamma^*$, front wheel lateral slip angle $\beta_f$, and the corrected yaw rate $\gamma$b for braking, and it determines this corrected yaw rate $\gamma$b for braking on the basis of the determined yaw rate $\gamma$, the determined target yaw rate $\gamma^*$, the determined front wheel lateral slip angle $\beta_f$, and the stored second relationship. This second relationship is determined in such a manner that the deviation between the target yaw rate $\gamma^*$ and the corrected yaw rate $\gamma$b for braking increases as the magnitude $|\beta_f|$ of the front wheel lateral slip angle $\beta_f$ increases up to a predetermined set value, and that the corrected yaw rate $\gamma$b for braking becomes equal to the yaw rate $\gamma$ when the target yaw rate $\gamma^*$ and the yaw rate $\gamma$ are equal.

In the present embodiment, as illustrated by equation (5) below and FIG. 5, until the magnitude $|\beta_f|$ of the front wheel lateral slip angle $\beta_f$ reaches a predetermined set value $\beta_{max}$, the corrected yaw rate $\gamma$b for braking is treated as a linear function of the front wheel lateral slip angle $\beta_f$, and if $|\beta_f|$ is equal to or more than this predetermined set value $\beta_{max}$, then the corrected yaw rate $\gamma$b for braking is set to $(2\gamma - \gamma^*)$.

$$\gamma b = -2|\beta_f|(\gamma^* - \gamma)/\beta_{max} + \gamma^* \quad (5)$$

Figure 6:
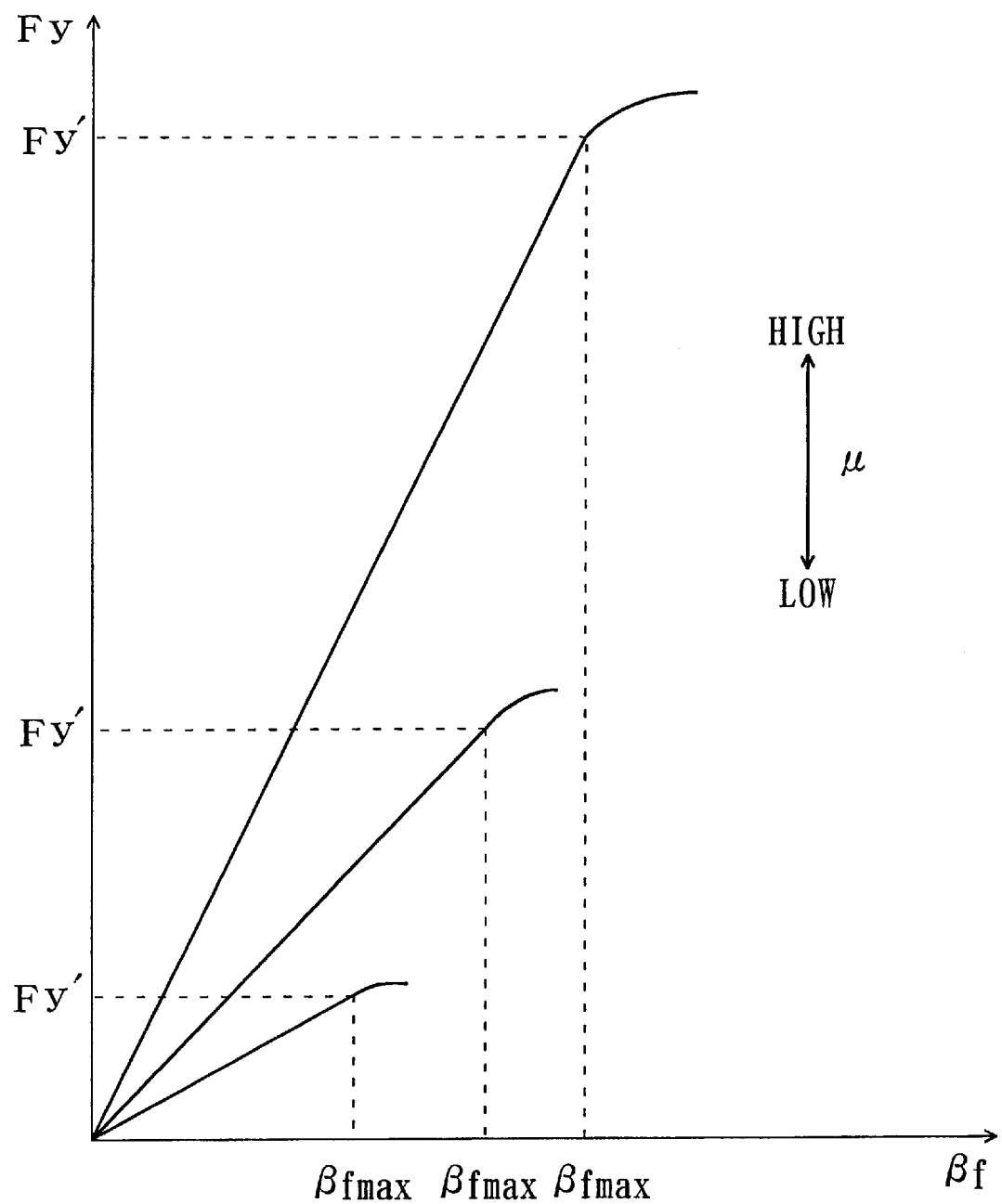
FIG. 6 is a diagram showing the relationship between the front wheel lateral slip angle and cornering force.

This predetermined set value $\beta_{max}$ is set at or below the maximum value of the front wheel lateral slip angle which maintains a linear region wherein the front wheel lateral slip angle $\beta$ is proportional to the cornering force, and in the present embodiment, it is set to the front wheel lateral slip angle at maximum lateral force. The front wheel lateral slip angle $\beta_f$, correlates to the coefficient $\mu$ of friction between the front wheel tires and the road surface. As shown in FIG. 6, the front wheel lateral slip angle $\beta_{fmax}$ when the cornering force $F_y$ reaches a value $F_y'$ corresponding to maximum lateral force increases as the coefficient $\mu$ of friction rises. $\beta_{fmax}$ can be determined on the basis of this relationship, for example, it can be determined approximately from the tire load W on each vehicle wheel, the coefficient $\mu$ of friction between the road surface and the tires, and the sum $K_f$ of front wheel cornering power when braking, according to the following equation (6).

$$\tan(\beta_{fmax}) = 3\mu W/K_f \quad (6)$$

Here, the sum $K_f$ of front wheel cornering power when braking is the sum of the cornering power $K_{f1}$, $K_{f2}$ at the front left and right wheels when braking, namely, $K_{f1} + K_{f2} = K_f$. The values of the cornering power $K_{f1}$, $K_{f2}$ at the front left and right wheels when braking are given by equations (7) and (8) below.

$$K_{f1} = \mu \cdot K_{f0} \cdot [\{1 - (G_x/2L + G_y/2d) \cdot h_g\}^2 - (P_{f1}/\mu \cdot P_f)^2]^{1/2} \quad (7)$$

$$K_{f2} = \mu \cdot K_{f0} \cdot [\{1 - (G_x/2L - G_y/2d) \cdot h_g\}^2 - (P_{f2}/\mu \cdot P_f)^2]^{1/2} \quad (8)$$

The front wheel cornering power $K_{f0}$ per wheel when braking and the front wheel lock pressure $P_f$ at static load are previously determined and stored in the driving system control device 60. The coefficient $\mu$ of friction is previously determined. For example, a relationship between vehicle speed, wheel revolution speed, and the road surface coefficient of friction is previously determined and stored in the driving system control device 60, and the coefficient $\mu$ of friction can be determined from this stored relationship, the vehicle speed V as detected by the speed sensor 14, and the wheel speeds $\omega 1$ through $\omega 4$ as detected by the wheel speed sensors 62.

If the magnitude $|\beta_f|$ of the front wheel lateral slip angle $\beta_f$ is equal to or greater then the predetermined set value $\beta_{max}$, then the deviation between the target yaw rate $\gamma^*$ and the corrected yaw rate $\gamma$s for steering is a minimum, and in the present embodiment, this deviation is taken as zero, by setting mutually equal values for the corrected yaw rate $\gamma$s for steering and the target yaw rate $\gamma^*$.

If the magnitude $|\beta_f|$ of the front wheel lateral slip angle $\beta_f$ is zero, then the deviation between the target yaw rate $\gamma^*$ and the corrected yaw rate $\gamma$b for braking is a minimum, and in the present embodiment, this deviation is taken as zero.

In FIG. 2, G1 is the transfer function of the target steering angle $\delta^*$ with respect to the deviation between the target yaw rate $\gamma^*$ and the actual yaw rate $\gamma$ of the vehicle 100.

When the vehicle is not in a state of under-steer, the steering system control device 20 calculates a target steering angle $\delta^*$ from the stored relationship $\delta^* = G1 \cdot (\gamma^* - \gamma)$, the calculated target yaw rate $\gamma^*$ and the yaw rate $\gamma$ as detected by the yaw rate sensor 16. If PI (proportional integral) control is implemented, for example, and Ka is taken as the gain, s as the Laplace operator, and Ta as the time constant, then the transfer function G1 is given by G1=Ka [1+1/(Ta·s)]. The gain Ka and time constant Ta are adjusted in such a manner that optimal control is performed.

If the vehicle is in a state of under-steer, then the steering system control device 20 calculates the target steering angle $\delta^*$ on the basis of the transfer function G1, by using the corrected yaw rate $\gamma s$ for steering instead of the yaw rate $\gamma$. In other words, it calculates the target steering angle $\delta^*$ from the relationship $\delta^* = G1 \cdot (\gamma^* - \gamma s)$, the calculated target yaw rate $y^*$, and the corrected yaw rate $\gamma s$ for steering.

To sum up, the steering system control device 20 stores a transfer function G1 representing a predetermined relationship between the deviation $(\gamma^* - \gamma)$ of the target yaw rate $\gamma^*$ and the yaw rate $\gamma$ and the target steering angle $\delta^*$, and on the basis of this relationship, it calculates a target steering angle $\delta^*$ corresponding to the deviation $(\gamma^* - \gamma)$ when the vehicle is not in the state of under-steer, but when the vehicle is in the state of under-steer, it calculates a target steering angle $\delta^*$ corresponding to the deviation $(\gamma^* - \gamma s)$.

In the present embodiment, the gain Ka is taken as a function of the vehicle speed V, and is set such that it decreases as the vehicle speed V increases in order to maintain stability at high speeds.

G2 is the transfer function of the target drive current im* for the steering actuator M with respect to the deviation between the target steering angle $\delta^*$ and the steering angle $\delta$. The steering system control device 20 calculates the target drive current im* from the relationship im* = G2·($\delta^*$−$\delta$), the calculated target steering angle $\delta^*$, and the steering angle $\delta$ detected by the steering angle sensor 13. If PI control is implemented, for example, and Kb is taken as the gain, s as the Laplace operator, and Tb as the time constant, then the transfer function G2 is given by G2=Kb [1+1/(Tb·s)]. The gain Kb and time constant Tb are adjusted in such a manner that optimal control is performed. In other words, the steering system control device 20 stores the transfer function G2 representing a predetermined relationship between the target drive current im* and the deviation ($\delta^*$−$\delta$), and on the basis of this relationship, it calculates the target drive current im* corresponding to the calculated deviation ($\delta^*$−$\delta$). The steering angle $\delta$ is caused to change by operating the steering actuator M by applying the target drive current im* thereto. Consequently, when the vehicle is not in the state of under-steer, the steering system control device 20 controls the steering actuator M in such a manner that the yaw rate $\gamma$ follows the target yaw rate $\gamma^*$, and when the vehicle is in the state of under-steer, it controls the steering actuator M in such a manner that the corrected yaw rate $\gamma s$ for steering, instead of the yaw rate $\gamma$, follows the target yaw rate $\gamma^*$.

G3 is the transfer function of the target drive current ih* for the reactive force actuator R with respect to the deviation between the target operational torque Th* and the operational torque Th. The steering system control device 20 calculates the target drive current ih* from the stored relationship ih* = G3·(Th*−Th), the calculated value for target operational torque Th*, and the operational torque Th detected by the torque sensor 12. If PI control is implemented, for example, and Kc is taken as the gain, s as the Laplace operator, and Tc as the time constant, then the transfer function G3 is given by G3=Kc [1+1/(Tc·s)]. The gain Kc and time constant Tc are adjusted in such a manner that optimal control is performed. In other words, the steering system control device 20 stores the transfer function G3 representing a predetermined relationship between the target drive current ih* and the deviation obtained by subtracting the detected operational torque Th from the target operational torque Th*, and on the basis of this relationship, it calculates the target drive current ih* corresponding to the calculated target operational torque Th* and the detected operational torque Th. The actuator R is driven in accordance with this target drive current ih*.

F2 is a calculating section in the driving system control device 60. When the vehicle is not in a state of under-steer, it calculates command braking pressures $\Delta P1$, $\Delta P2$, $\Delta P3$, $\Delta P4$ for the front and rear, left and right wheels 4 of the vehicle, in such a manner that a yaw moment, which acts to eliminate the deviation $(\gamma^* - \gamma)$ between the target yaw rate $\gamma^*$ calculated according to the amount of operation of the steering wheel 1 and the yaw rate $\gamma$, is generated by the control of braking force. If the vehicle is in the state of under-steer, then it calculates command braking pressures $\Delta P1$, $\Delta P2$, $\Delta P3$, $\Delta P4$ by using the corrected yaw rate $\gamma b$ for braking instead of the yaw rate $\gamma$, in such a manner that a yaw moment, which acts to eliminate the yaw rate deviation $(\gamma^* - \gamma b)$ between the target yaw rate $\gamma^*$ and the corrected yaw rate $\gamma b$ for braking, is generated by the control of braking force. In other words, it calculates the respective command braking pressures $\Delta P1$, $\Delta P2$, $\Delta P3$, $\Delta P4$ in such a manner that, when generating a yaw moment for causing the vehicle 100 to turn to the right, the braking pressure on the right-hand wheels is made greater than that on the left-hand wheels, and when generating a yaw moment for causing the vehicle 100 to turn to the left, the braking pressure on the left-hand wheels is made greater than that on the right-hand wheels. The respective command braking pressures $\Delta P1$, $\Delta P2$, $\Delta P3$, $\Delta P4$ are determined as deviations from the wheel cylinder pressures $P_{f1}$, $P_{f2}$, $P_{r1}$, $P_{r2}$, detected by the braking pressure sensors 61. In other words, the driving system control device 60 stores a relationship between the yaw rate deviation, the respective command braking pressures $\Delta P1$, $\Delta P2$, $\Delta P3$, $\Delta P4$ at the vehicle wheels 4 and the wheel speeds $\omega 1$ through $\omega 4$ at the respective vehicle wheels 4, and it calculates the command braking pressures $\Delta P1$, $\Delta P2$, $\Delta P3$, $\Delta P4$ on the basis of this stored relationship, the wheel cylinder pressures $P_{f1}$, $P_{f2}$, $P_{r1}$, $P_{r2}$ detected by the braking pressures sensors 61, the wheel speeds $\omega 1$, $\omega 2$, $\omega 3$, $\omega 4$ as detected by the wheel speed sensors 62, and, when there is no under-steer, the yaw rate deviation $(\gamma^* - \gamma)$, or when there is under-steer, the yaw rate deviation $(\gamma^* - \gamma b)$. The braking control unit B causes the braking forces at the respective wheels 4 to change in accordance with the calculated command braking pressures $\Delta P1$, $\Delta P2$, $\Delta P3$, $\Delta P4$, thereby controlling the braking forces to the respective wheels 4. In this way, when the vehicle is not in the state of under-steer, the driving system control device 60 controls the braking forces to the wheels 4 in such a manner that the yaw rate $\gamma$ follows the target yaw rate $\gamma^*$, and when the vehicle is in the state of under-steer, it controls the braking forces to the wheels 4 in such a manner that, instead of the yaw rate $\gamma$, the corrected yaw rate $\gamma b$ for braking follows the target yaw rate $\gamma^*$.

Figure 7:
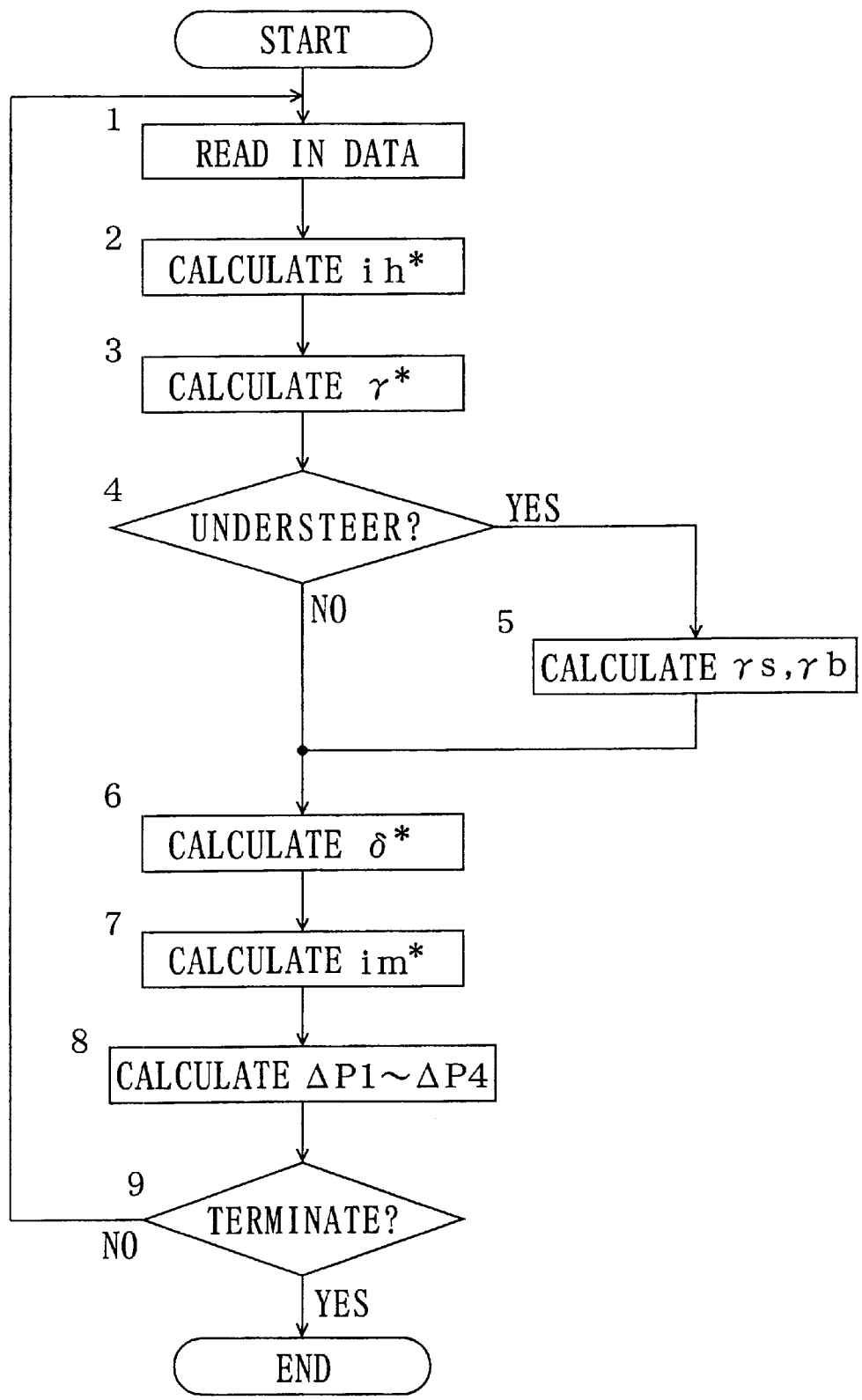
FIG. 7 is a flowchart showing a control procedure in a vehicle attitude control apparatus according to the first embodiment of the present invention.

A control sequence of the aforementioned composition is described here with reference to the flowchart in FIG. 7.

Firstly, detection data is read in from the sensors 11 through 16, 61, 62 (step 1). Thereupon, the target drive current ih* for the reactive force actuator R is determined on the basis of the gain K2 and the transfer function G3 (step 2), and the reactive force actuator R is controlled by applying this target drive current ih* thereto. Next, the target yaw rate $\gamma^*$ is determined on the basis of the gain K1 (step 3). Thereupon, it is judged whether or not the vehicle is in a state of under-steer (step 4), and if it is in the state of under-steer, then the corrected yaw rate $\gamma s$ for steering and corrected yaw rate $\gamma b$ for braking are determined and stored (step 5). If the vehicle is not in the state of under-steer, then the target steering angle $\delta^*$ is determined on the basis of the transfer function G1, according to the deviation $(\gamma^* - \gamma)$ between the target yaw rate $\gamma^*$ and the detected yaw rate $\gamma$, whereas if the vehicle is in the state of under-steer, then the target steering angle δ* is determined on the basis of the transfer function G1, according to deviation (γ*−γs) between the target yaw rate γ* and the determined corrected yaw rate γs for steering (step 6). The target drive current im* for the steering actuator M is determined on the basis of the transfer function G2, in such a manner that the deviation obtaining by subtracting the steering angle δ0 from the target steering angle δ* becomes zero (step 7). This target drive current im* is applied to the steering actuator M, which is thereby controlled so as to generated changes in the steering angle. The command braking pressures ΔP1, ΔP2, ΔP3, ΔP4 to the respective wheels 4 are determined in such a manner that, if the vehicle is not in the state of under-steer, then a yaw moment acting to reduce the deviation (γ*−γ) between the target yaw rate γ* and the detected yaw rate γ is generated by means of braking force control, whereas if the vehicle is in the state of under-steer, then a yaw moment acting to reduce the deviation (γ*−γb) between the target yaw rate γ* and the determined corrected yaw rate γb for braking is generated by means of braking force control (step 8). The braking control unit B is controlled so as to vary the braking forces to the wheels 4 in accordance with the determined command braking pressures ΔP1, ΔP2, ΔP3, ΔP4. Thereupon, it is judged whether or not to terminate the control sequence (step 9), and if the procedure is not to be terminated, then the sequence returns to step 1. It can be judged if the sequence is to terminate by, for example, judging whether or not the vehicle ignition key is switched on.

Figure 8:
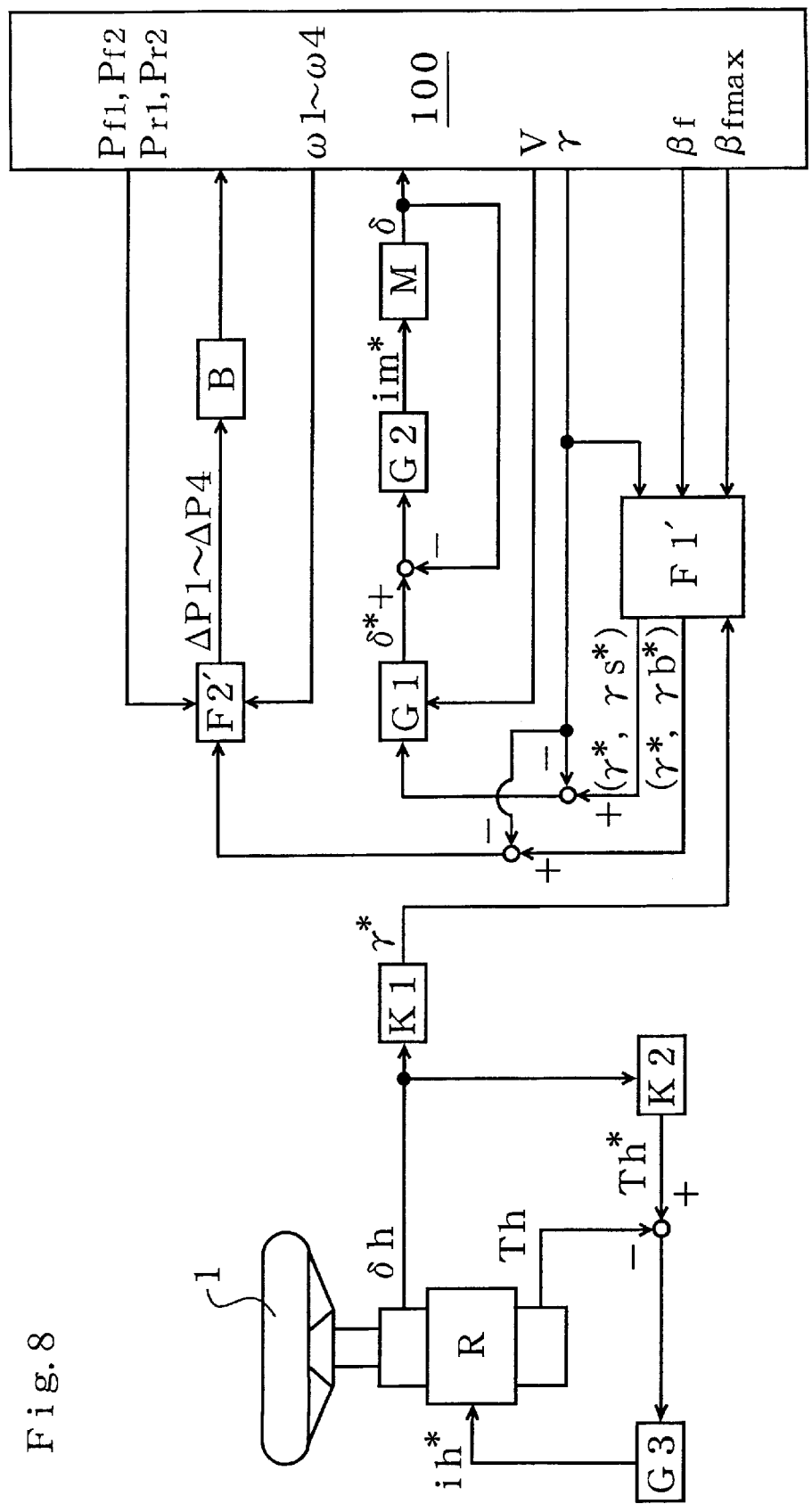
FIG. 8 is a control block diagram of the vehicle attitude control apparatus according to the second embodiment of the present invention.
Figure 9:
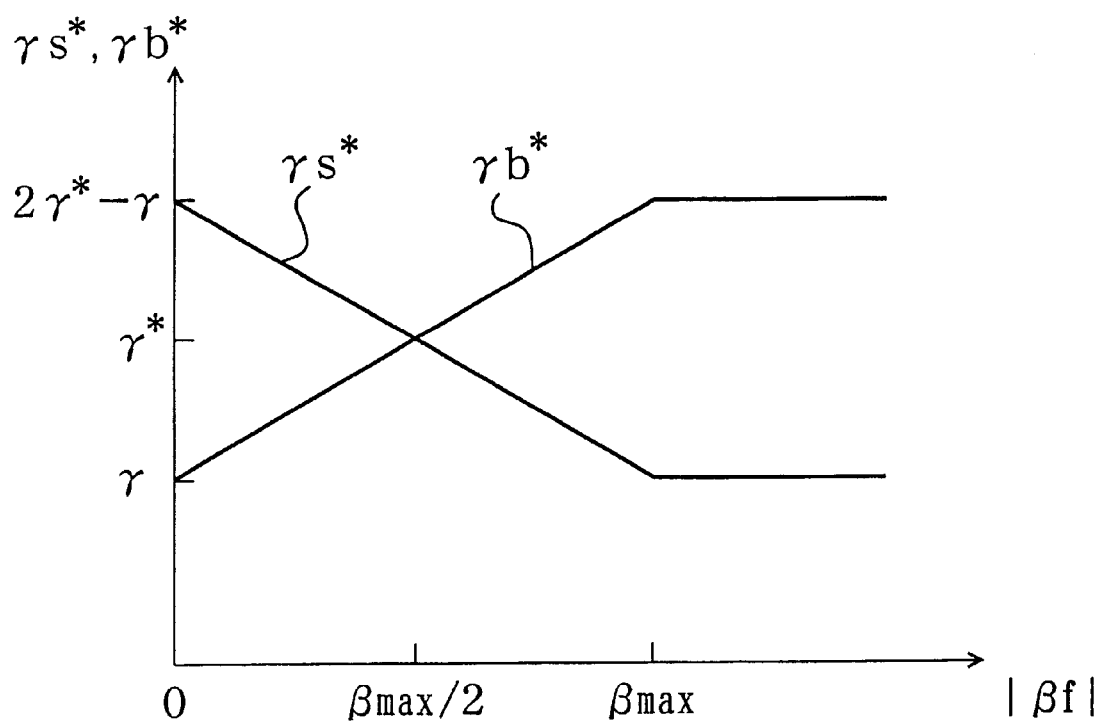
FIG. 9 is a diagram showing the relationship between the front wheel slip angle, the corrected yaw rate for steering angle, and the corrected yaw rate for braking, in the vehicle attitude control apparatus according to the second embodiment of the present invention.

FIG. 8 and FIG. 9 show a second embodiment of the present invention. Parts which are the same as the previous embodiment are similarly labelled. The difference with respect to the first embodiment is that instead of the calculating section F1 in the driving system control device 60, a calculating section F1' performs calculation for judging whether or not the vehicle is in a state of under-steer, calculation of the front wheel lateral slip angle $\beta_f$ as the instability index value corresponding to the degree of under-steer, calculation of a corrected target yaw rate γs* for steering, and calculation of a corrected target yaw rate γb* for braking. The judgement of whether or not the vehicle is in a state of under-steer and the calculation of the front wheel lateral slip angle $\beta_f$ are performed in a similar manner to the first embodiment.

The driving system control device 60 stores a predetermined first relationship between the yaw rate γ, the target yaw rate γ*, the front wheel lateral slip angle $\beta_f$, and the corrected target yaw rate γs* for steering, and it determines the corrected target yaw rate γs* for steering on the basis of this stored first relationship. This first relationship is set in such a manner that the deviation between the yaw rate γ and the corrected target yaw rate γs* for steering decreases as the magnitude $|\beta_f|$ of the front wheel lateral slip angle $\beta_f$ increases to a predetermined set value, and such that the corrected target yaw rate γs* for steering is set equally to the target yaw rate γ*, when the target yaw rate γ* and the yaw rate γ are equal.

In the present embodiment, as shown in equation (9) below and FIG. 9, until the magnitude $|\beta_f|$ of the front wheel lateral slip angle $\beta_f$ reaches a predetermined set value $\beta_{max}$, the corrected target yaw rate γs* for steering is taken as a linear function of the front wheel lateral slip angle $\beta_f$, and when $|\beta_f|$ is equal to or greater than the predetermined set value $\beta_{max}$, then the corrected target yaw rate γs* for steering is set equally to the yaw rate γ.

$$\gamma s=-2|\beta_f|(\gamma^*-\gamma)/\beta_{max}+2\gamma^*-\gamma \quad (9)$$

The driving system control device 60 stores the relationship between the yaw rate γ, target yaw rate γ*, front wheel lateral slip angle $\beta_f$, and corrected target yaw rate γb* for braking, as a second predetermined relationship, and determines the corrected target yaw rate γb* for braking on the basis of the determined yaw rate γ, the determined target yaw rate γ*, the determined front wheel lateral slip angle $\beta_f$, and the stored second relationship. This second relationship is determined in such a manner that the deviation between the yaw rate γ and the corrected target yaw rate γb* for braking increases as the magnitude $|\beta_f|$ of the front wheel lateral slip angle $\beta_f$ increases to a predetermined set value, and such that the corrected target yaw rate γb* for braking is set equally to the target yaw rate γ* when the target yaw rate γ* and the yaw rate γ are equal.

In the present embodiment, as shown by the equation (10) below and FIG. 9, until the magnitude $|\beta_f|$ of the front wheel lateral slip angle $\beta_f$ reaches a predetermined set value $\beta_{max}$, the corrected target yaw rate γb* for braking is taken as a linear function of the front wheel lateral slip angle $\beta_f$, and if $|\beta_f|$ is equal to or greater than the predetermined set value $\beta_{max}$, then the corrected target yaw rate γb* for braking is taken as (2γ*−γ).

$$\gamma b^*=2|\beta_f|(\gamma^*-\gamma)/\beta_{max}+\gamma \quad (10)$$

Similarly to the first embodiment, the predetermined set value $\beta_{max}$ in equations (9) and (10) is set at or below the maximum value of the front wheel lateral slip angle which maintains a linear region wherein the front wheel lateral slip angle β is proportional to the cornering force, and in the present embodiment, it is set to the front wheel lateral slip angle at maximum lateral force.

If the magnitude $|\beta_f|$ of of the front wheel lateral slip angle $\beta_f$ is equal to or greater than the predetermined set value $\beta_{max}$, then the deviation between the corrected target yaw rate γs* for steering and the yaw rate γ is a minimum, in the present embodiment, this deviation is taken as zero by setting the corrected target yaw rate γs* for steering and the yaw rate γ to equal values.

If the magnitude $|\beta_f|$ of the front wheel lateral slip angle $\beta_f$ is zero, then the deviation between the corrected target yaw rate γb* for braking and the yaw rate γ is a minimum, in the present embodiment, this deviation is taken as zero.

If the vehicle is not in the state of under-steer, then similarly to the first embodiment, the steering system control device 20 determines the target steering angle δ* from the stored relationship δ*=G1·(γ*−γ), the determined target yaw rate γ*, and the yaw rate γ detected by the yaw rate sensors 16. If the vehicle is in the state of under-steer, then the control device 20 uses the corrected target yaw rate γs* for steering instead of the target yaw rate γ* and determines the target steering angle δ* from the relationship δ*=G1·(γs*−γ), the determined corrected target yaw rate γs* for steering, and the detected yaw rate γ. In other words, the steering system control device 20 stores the transfer function G1 representing a predetermined relationship between the target steering angle δ* and the deviation (γ*−γ) of the target yaw rate γ* and the yaw rate γ, and on the basis of this relationship, it determines a target steering angle δ* corresponding to the deviation (γ*−γ) when the vehicle is not in the state of under-steer, but when the vehicle is in the state of under-steer, it determines the target steering angle δ* corresponding to the deviation (γs*−γ). A target drive current im* determined on the basis of the transfer function G2 is applied to the steering actuator M, in such a manner that the deviation obtained by subtracting the steering angle δ from the target steering angle δ* becomes zero. Thereby, when the vehicle is not in the state of under-steer, the steering system control device 20 controls the steering actuator M in such a manner that the yaw rate $\gamma$ follows the target yaw rate $\gamma^*$, and when the vehicle is in the state of under-steer, it controls the steering actuator M in such a manner that the yaw rate $\gamma$ follows the corrected target yaw rate $\gamma s^*$ for steering, instead of the target yaw rate $\gamma^*$.

Moreover, in the calculating section F2', the driving system control device 60 determines command braking pressures $\Delta P1$, $\Delta P2$, $\Delta P3$, $\Delta P4$ for the front and rear, left and right wheels 4 of the vehicle, in such a manner that, when the vehicle is not in the state of under-steer, the deviation ($\gamma^*-\gamma$) between the target yaw rate $\gamma^*$ determined according to the amount of operation of the steering wheel 1 and the yaw rate $\gamma$ is eliminated, similarly to the first embodiment. When the vehicle is in the state of under-steer, the driving system control device 60 uses the corrected target yaw rate $\gamma b^*$ for braking instead of the target yaw rate $\gamma^*$ and determine the command braking pressures $\Delta P1$, $\Delta P2$, $\Delta P3$, $\Delta P4$, in such a manner that the deviation ($\gamma b^*-\gamma$) between the corrected target yaw rate $\gamma b^*$ for braking and the yaw rate $\gamma$ is eliminated. In other words, the command braking pressures $\Delta P1$, $\Delta P2$, $\Delta P3$, $\Delta P4$ to the respective wheels 4 are determined in such a manner that, a yaw moment, which reduces or desirably cancels out the deviation ($\gamma^*-\gamma$) in the state of no under-steer and the deviation ($\gamma b^*-\gamma$) in the state of under-steer, is generated by the control of braking force applied to the wheels 4.

Therefore, the driving system control device 60 stores a relationship between the yaw rate deviation, the command braking pressures $\Delta P1$, $\Delta P2$, $\Delta P3$, $\Delta P4$ at the respective wheels 4 and the rotational speeds $\omega 1$ through $\omega 4$ of the respective wheels 4, and it determines the command braking pressures $\Delta P1$, $\Delta P2$, $\Delta P3$, $\Delta P4$ from this stored relationship, the wheel cylinder pressures $P_{f1}$, $P_{f2}$, $P_{r1}$, $P_{r2}$ detected by the braking force sensors 61, the wheel speeds $\omega 1$, $\omega 2$, $\omega 3$, $\omega 4$ detected by the wheel speed sensors 62, and, in the case of no under-steer, the yaw rate deviation ($\gamma^*-\gamma$), and in the case of under-steer, the yaw rate deviation ($\gamma b^*-\gamma$). The braking control unit B causes the braking forces at the respective wheels 4 to change in accordance with the determined command braking pressures $\Delta P1$, $\Delta P2$, $\Delta P3$, $\Delta P4$, thereby controlling the braking forces to the respective wheels 4. In this way, when the vehicle is not in the state of under-steer, the driving system control device 60 controls the braking forces to the wheels 4 in such a manner that the yaw rate $\gamma$ follows the target yaw rate $\gamma^*$, and when the vehicle is in the state of under-steer, it controls the braking forces to the wheels 4 in such a manner that the yaw rate $\gamma$ follows the corrected target yaw rate $\gamma b^*$ for braking, instead of the target yaw rate $\gamma^*$.

The differences between the control sequence for the first embodiment illustrated in the flowchart in FIG. 7 and the control sequence for the second embodiment are that when the vehicle is in the state of under-steer, a corrected target yaw rate $\gamma s^*$ for steering and corrected target yaw rate $\gamma b^*$ for braking are determined and stored at step 5, a target steering angle $\delta^*$ is determined on the basis of the transfer function G1 according to the deviation ($\gamma s^*-\gamma$) between the corrected target yaw rate $\gamma s^*$ for steering and the yaw rate $\gamma$ at step 6, and command braking pressures $\Delta P1$, $\Delta P2$, $\Delta P3$, $\Delta P4$ for the respective wheels 4 are determined in such a manner that a yaw moment for reducing the deviation ($\gamma b^*-\gamma$) between the corrected target yaw rate $\gamma b^*$ for braking and the yaw rate $\gamma$ is generated by braking force control at step 8. Apart from these differences, the sequence is the same as in the first embodiment.

According to the embodiments described above, when the vehicle is not in the state of under-steer, the steering actuator M and the braking forces to the wheels are controlled in such a manner that the deviation between the target yaw rate $\gamma^*$ of the vehicle corresponding to the amount of operation of the steering wheel 1 and the detected yaw rate $\gamma$ of the vehicle is reduced, thereby stabilizing the behaviour of the vehicle. In the first embodiment, when the vehicle is in the state of under-steer, the steering actuator M is controlled in such a manner that the deviation between the target yaw rate $\gamma^*$ and the corrected yaw rate $\gamma s$ for steering, instead of the yaw rate $\gamma$, is reduced, and the braking forces are controlled in such a manner that the deviation between the target yaw rate $\gamma^*$ and the corrected yaw rate $\gamma b$ for braking, instead of the yaw rate $\gamma$, is reduced. If the degree of under-steer increases, then the deviation between the target yaw rate $\gamma^*$ and the corrected yaw rate $\gamma^*$ for steering reduces, whilst the deviation between the target yaw rate $\gamma^*$ and the corrected yaw rate $\gamma b$ for braking increases. Furthermore, in the second embodiment, if the vehicle is in the state of under-steer, then the steering actuator M is controlled in such a manner that the deviation between the yaw rate $\gamma$ and the corrected target yaw rate $\gamma s^*$ for steering, instead of the target yaw rate $\gamma^*$, is reduced, and the braking forces are controlled in such a manner that the deviation between the yaw rate $\gamma$ and the corrected target yaw rate $\gamma b^*$ for braking, instead of the target yaw rate $\gamma$ is reduced. As the degree of under-steer increases, the deviation between the corrected target yaw rate $\gamma s^*$ for steering and the yaw rate $\gamma$ decreases, whilst the deviation between the corrected target yaw rate $\gamma b^*$ for braking and the yaw rate $\gamma$ increases. Therefore, as the degree of under-steer increases, the amount of control of the steering actuator M for stabilizing the vehicle behaviour decreases, and the amount of control of the braking force increases. Accordingly, in the state of under-steer, it is possible to prevent the steering angle from increasing excessively, and hence the vehicle behaviour can be stabilized. Moreover, the braking force for stabilizing the vehicle behaviour can be increased as the degree of under-steer rises, without having to provide complicated controls. Furthermore, if the magnitude of the lateral slip angle $\beta_f$, of the wheels 4 is equal to or greater than the front wheel lateral slip angle $\beta_{max}$ at maximum lateral force, then in the first embodiment, the deviation between the target yaw rate $\gamma^*$ and the corrected yaw rate $\gamma s$ for steering is taken as zero, and in the second embodiment, the deviation between the corrected target yaw rate $\gamma s^*$ for steering and the yaw rate $\gamma$ is taken as zero. Thereby, the steering angle is prevented from increasing excessively in the case of under-steer, and hence making it possible to maintain a linear region wherein the lateral slip angle $\beta_f$ is proportional to the cornering forces at the wheels 4, and to prevent effectively the vehicle behaviour from becoming unstable by control of the braking forces. Moreover, if the magnitude of the front wheel lateral slip angle $\beta_f$ is zero, then in the first embodiment, the deviation between the target yaw rate $\gamma^*$ and the corrected yaw rate $\gamma b$ for braking is taken as zero, and in the second embodiment, the deviation between the corrected target yaw rate $\gamma b^*$ for braking and the yaw rate $\gamma$ is taken as zero, thereby making it possible to stabilize vehicle behaviour simply by controlling the steering angle when the lateral slipping state of the wheels 4 terminates, and hence eliminating unnecessary controls and simplifying the control system.

A vehicle provided with the attitude control apparatus according to the first embodiment was driven in a right-hand turn on a road surface covered by compacted snow, and the temporal change in the yaw rate $\gamma$, target yaw rate $\gamma^*$, corrected yaw rate $\gamma s$ for steering, corrected yaw rate $\gamma b$ for braking, vehicle speed V, steering angle δ, rear right wheel cylinder pressure $P_{r2}$, and front wheel lateral slip angle $β_f$ was measured.

Figure 10:
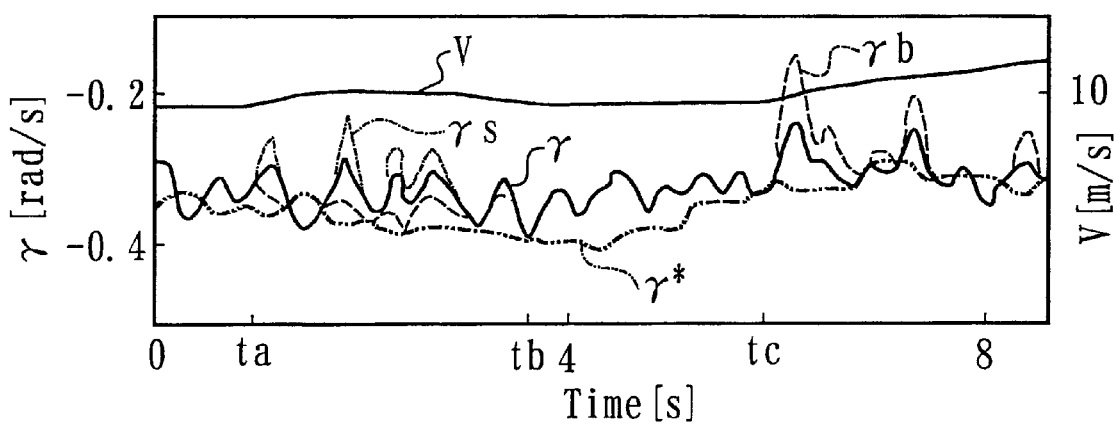
FIG. 10(1) is a diagram showing the variation over time of the yaw rate, target yaw rate, corrected yaw rate for steering angle, corrected yaw rate for braking and vehicle speed, in a case of a travelling vehicle provided with the attitude control apparatus according to the first embodiment of the present invention.
Figure 10:
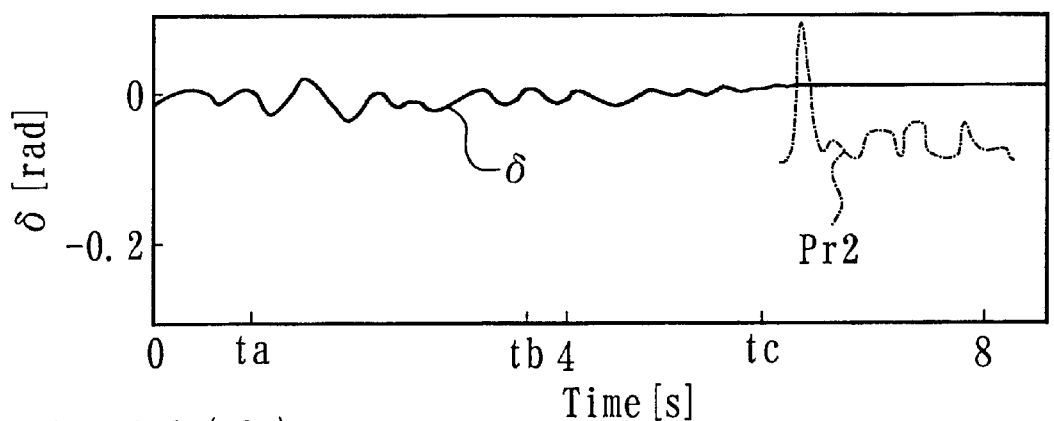
Figure 10:
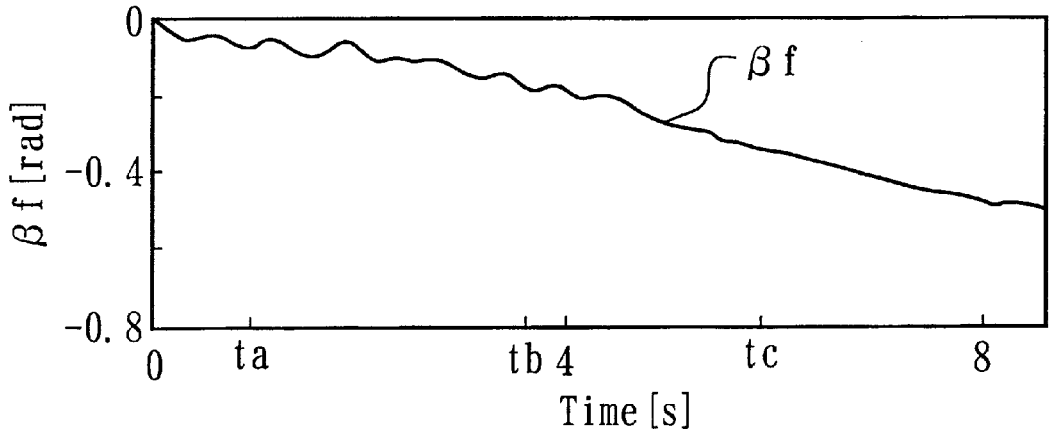

FIG. 10(1) shows the temporal change of the detected yaw rate γ and vehicle speed V by solid lines, the target yaw rate γ* by double-dotted line, the corrected yaw rate γs for steering by single-dotted line, and corrected yaw rate γb for braking by broken line, FIG. 10(2) shows the temporal change of the steering angle δ by solid line, and right rear wheel cylinder pressure $P_{r2}$ by single-dotted line, and FIG. 10(3) shows the temporal change of the front wheel lateral slip angle $β_f$, by solid lien. Up until time ta, the vehicle speed is a constant 8.33 m/s, from time ta to time tb, it gradually accelerates and then gradually decelerates back to 8.33 m/s again, from time tb to time tc, it remains constant, and from time tc, it accelerates suddenly. Furthermore, the front wheel lateral slip angle $β_{fmax}$ at maximum lateral force was taken to be 0.384 rad.

Up to time ta, it was judged to be a state of no under-steer, and therefore the steering actuator M for changing the steering angle δ and the wheel cylinder pressure $P_{r2}$ are controlled according to the deviation between the target yaw rate γ* and the yaw rate γ. Since this deviation (γ*−γ) is small, the wheel cylinder pressure $P_{r2}$ is not changed and only the steering angle δ is changed.

From time ta, it was judged to be a state of under-steer, and therefore the steering actuator M for changing the steering angle δ is controlled in accordance with the deviation (γ*−γs) between the target yaw rate γ* and the corrected yaw rate γs for steering, and the wheel cylinder pressure $P_{r2}$ is controlled in accordance with the deviation (γ*−γb) between the target yaw rate γ* and the corrected yaw rate γb for braking.

From time ta until time tb, the front wheel lateral slip angle $β_f$ is small, and hence the change in the steering angle δ corresponding to the deviation (γ*−γs) between the target yaw rate γ* and the corrected yaw rate γs for steering is large, and no control is applied to the wheel cylinder pressure $P_{r2}$ in accordance with the deviation between the target yaw rate γ* and the corrected yaw rate γb for braking. At time tb, the front wheel lateral slip angle $β_f$ reaches ½ of the front wheel lateral slip angle $β_{fmax}$ at maximum lateral force, and hence as shown in formulae (4) and (5) above, the yaw rate γ is equal to the corrected yaw rate γs for steering and the corrected yaw rate γb for braking.

Between time tb and time tc, there is no acceleration, and hence the steering angle δ hardly changes and no control is applied to the wheel cylinder pressure $P_{r2}$.

From time tc, the front wheel lateral slip angle $β_f$ becomes equal to or greater than the front wheel lateral slip angle $β_{fmax}$ at maximum lateral force, and hence the amount of control of the wheel cylinder pressure $P_{r2}$ according to the deviation (γ*−γb) between the target yaw rate γ* and the corrected yaw rate γb for braking increases, whilst no control is applied to the steering actuator M in accordance with the deviation (γ*−γs) between the target yaw rate γ* and the corrected yaw rate γs for steering.

The present invention is not limited to the aforementioned embodiments. For example, lateral acceleration may be used as a behaviour index value, and the lateral slip angle of the vehicle may be used as an instability index value.

What is claimed is:

1. A vehicle attitude control apparatus, comprising:

an operating member;

a steering actuator driven in accordance with the operation of said operating member;

a mechanism for transmitting movement of the steering actuator to the wheels of a vehicle, in such a manner that the steering angle changes in accordance with the movement thereof;

means for determining a behaviour index value corresponding to changes in vehicle behaviour on the basis of changes in the steering angle;

means for determining the amount of operation of said operating member;

means for determining a target behaviour index value corresponding to the determined amount of operation, on the basis of a stored relationship between the amount of operation and the target behaviour index value;

means for determining whether or not the vehicle is in a state of under-steer;

means for controlling said steering actuator in such a manner that the behaviour index value follows the target behaviour index value, when the vehicle is not in the state of under-steer;

means for controlling the braking forces at the vehicle wheels in such a manner that the behaviour index value follows the target behaviour index value, when the vehicle is not in the state of under-steer;

means for determining an instability index value correlating to the degree of under-steer;

means for storing a predetermined first relationship between the behaviour index value, the target behaviour index value, the instability index value and a corrected behaviour index value for steering;

means for determining said corrected behaviour index value for steering on the basis of the determined behaviour index value, the determined target behaviour index value, the determined instability index value, and the stored first relationship;

means for storing a predetermined second relationship between the behaviour index value, the target behaviour index value, the instability index value and a corrected behaviour index value for braking; and means for determining said corrected behaviour index value for braking on the basis of the determined behaviour index value, the determined target behaviour index value, the determined instability index value, and the stored second relationship;

wherein the first relationship is determined in such a manner, as the magnitude of the instability index value increases up to a predetermined set value, the deviation between the target behaviour index value and the corrected behaviour index value for steering decreases, and when the target behaviour index value and the behaviour index value are equal, the corrected behaviour index value for steering becomes equal to the behaviour index value;

the second relationship is determined in such a manner that as the magnitude of the instability index value increases up to a predetermined set value, the deviation between the target behaviour index value and the corrected behaviour index value for braking increases, and when the target behaviour index value and the behaviour index value are equal, the corrected behaviour index value for braking becomes equal to the behaviour index value; and when the vehicle is in the state of under-steer, said steering actuator is controlled in such a manner that said corrected behaviour index value for steering, instead of said behaviour index value, follows said target behaviour index value, and said braking forces are controlled in such a manner that said corrected behaviour index value for braking, instead of said behaviour index value, follows the target behaviour index value.

2. The vehicle attitude control apparatus according to claim 1,
wherein a vehicle wheel lateral slip angle is determined as said instability index value;
the deviation between the target behaviour index value and the corrected behaviour index value for steering is taken as zero, when the magnitude of the vehicle wheel lateral slip angle is equal to or greater than a predetermined set value; and
the predetermined set value for the magnitude of the vehicle wheel lateral slip angle is set at or below the maximum value of the magnitude of the wheel lateral slip angle which maintains a linear region in which the wheel lateral slip angle is proportional to the cornering force.

3. The vehicle attitude control apparatus according to claim 2, wherein the deviation between the target behaviour index value and the corrected behaviour index value for braking is taken as zero, when the magnitude of the vehicle wheel lateral slip angle is zero.

4. A vehicle attitude control apparatus, comprising:
an operating member;
a steering actuator driven in accordance with the operation of said operating member;
a mechanism for transmitting movement of the steering actuator to the wheels of a vehicle, in such a manner that the steering angle changes in accordance with the movement thereof;
means for determining a behaviour index value corresponding to changes in vehicle behaviour on the basis of changes in the steering angle;
means for determining the amount of operation of said operating member;
means for determining a target behaviour index value corresponding to the determined amount of operation, on the basis of a stored relationship between the amount of operation and the target behaviour index value;
means for determining whether or not the vehicle is in a state of under-steer;
means for controlling said steering actuator in such a manner that the behaviour index value follows the target behaviour index value, when the vehicle is not in the state of under-steer;
means for controlling the braking forces at the vehicle wheels in such a manner that the behaviour index value follows the target behaviour index value, when the vehicle is not in the state of under-steer;
means for determining an instability index value correlating to the degree of under-steer;
means for storing a predetermined first relationship between the behaviour index value, the target behaviour index value; the instability index value and a corrected target behaviour index value for steering;
means for determining said corrected target behaviour index value for steering on the basis of the determined behaviour index value, the determined target behaviour index value, the determined instability index value, and the stored first relationship;
means for storing a predetermined second relationship between the behaviour index value, the target behaviour index value, the instability index value and a corrected target behaviour index value for braking; and
means for determining said corrected target behaviour index value for braking on the basis of the determined behaviour index value, the determined target behaviour index value, the determined instability index value, and the stored second relationship;
wherein the first relationship is determined in such a manner, as the magnitude of the instability index value increases up to a predetermined set value, the deviation between the corrected target behaviour index value for steering and the behaviour index value decreases, and when the target behaviour index value and the behaviour index value are equal, the corrected target behaviour index value for steering becomes equal to the target behaviour index value;
the second relationship is determined in such a manner that, as the magnitude of the instability index value increases up to a predetermined set value, the deviation between the corrected target behaviour index value for braking and the behaviour index value increases, and when the target behaviour index value and the behaviour index value are equal, the corrected target behaviour index value for braking becomes equal to the target behaviour index value; and
when the vehicle is in the state of under-steer, said steering actuator is controlled in such a manner that said behaviour index value follows the corrected target behaviour index value for steering, instead of the target behaviour index value, and the braking forces are controlled in such a manner that the behaviour index value follows the corrected target behaviour index value for braking, instead of the target behaviour index value.

5. The vehicle attitude control apparatus according to claim 4,
wherein a vehicle wheel lateral slip angle is determined as said instability index value;
the deviation between the corrected target behaviour index value for steering and the behaviour index value is taken as zero, when the magnitude of the vehicle wheel lateral slip angle is equal to or greater than a predetermined set value; and
the predetermined set value for the magnitude of the vehicle wheel lateral slip angle is set at or below the maximum value of the magnitude of the wheel lateral slip angle which maintains a linear region in which the wheel lateral slip angle is proportional to the cornering force.

6. The vehicle attitude control apparatus according to claim 5, wherein the deviation between the corrected target behaviour index value for braking and the behaviour index value is taken as zero, when the magnitude of the vehicle wheel lateral slip angle is zero.

* * * * *